United States Patent
Carsello

(10) Patent No.: US 7,106,814 B2
(45) Date of Patent: Sep. 12, 2006

(54) METHOD AND WIRELESS DEVICE EMPLOYING A PREAMBLE TO INITIATE COMMUNICATIONS

(75) Inventor: Stephen R. Carsello, Plantation, FL (US)

(73) Assignee: Motorola, Inc., Schaumburg, IL (US)

( * ) Notice: Subject to any disclaimer, the term of this patent is extended or adjusted under 35 U.S.C. 154(b) by 28 days.

(21) Appl. No.: 10/427,537

(22) Filed: Apr. 30, 2003

(65) Prior Publication Data
US 2004/0218699 A1   Nov. 4, 2004

(51) Int. Cl.
*H03D 1/00* (2006.01)
(52) U.S. Cl. ..................................... 375/343
(58) Field of Classification Search ................ 375/137, 375/136, 138, 219, 222, 343, 220, 142, 143, 375/152, 150, 259, 261, 269, 316, 329, 340, 375/331, 332; 370/280, 281, 294, 321, 347, 370/337, 503, 509, 510
See application file for complete search history.

(56) References Cited

U.S. PATENT DOCUMENTS

| | | | | |
|---|---|---|---|---|
| 5,241,568 A | * | 8/1993 | Fernandez et al. | 375/368 |
| 5,311,516 A | * | 5/1994 | Kuznicki et al. | 370/314 |
| 5,355,126 A | * | 10/1994 | Nelson et al. | 340/7.25 |
| 5,379,031 A | * | 1/1995 | Mondrosch et al. | 340/7.29 |
| 5,381,133 A | * | 1/1995 | Erhart et al. | 340/7.35 |
| 5,635,914 A | * | 6/1997 | Petreye et al. | 340/7.46 |
| 5,740,534 A | * | 4/1998 | Ayerst et al. | 340/7.42 |
| 5,898,744 A | * | 4/1999 | Kimbrow et al. | 375/376 |
| 6,414,986 B1 | * | 7/2002 | Usui | 375/142 |
| 6,671,284 B1 | * | 12/2003 | Yonge et al. | 370/462 |
| 6,816,716 B1 | * | 11/2004 | Shohara | 455/196.1 |
| 2002/0075163 A1 | * | 6/2002 | Smith et al. | 340/870.16 |
| 2003/0096631 A1 | * | 5/2003 | Kayama et al. | 455/522 |
| 2003/0142687 A1 | * | 7/2003 | Lin | 370/419 |
| 2004/0001532 A1 | * | 1/2004 | Mason et al. | 375/136 |
| 2004/0042385 A1 | * | 3/2004 | Kim et al. | 370/203 |
| 2004/0142696 A1 | * | 7/2004 | Saunders et al. | 455/450 |

* cited by examiner

*Primary Examiner*—Emmanuel Bayard

(57) ABSTRACT

A wireless receiver 300 and corresponding method to detect a message identifier or preamble that has been generated and provided by a transmitter 200 uses FFTs to estimate frequency and time offset. The wireless receiver 300 scans, asynchronously and sequentially during a wakeup time, a plurality of predetermined frequencies for the message identifier or specialized preamble. A plurality of received sample sequences are collected, one received sample sequence collected at each of the plurality of predetermined frequencies. A correlation between data corresponding to the preamble and data corresponding to a received sample sequence is compared to a threshold value to determine when the preamble has been detected. The wireless receiver 300 is wakened from a low power mode when the preamble is detected.

20 Claims, 5 Drawing Sheets

US 7,106,814 B2

METHOD AND WIRELESS DEVICE EMPLOYING A PREAMBLE TO INITIATE COMMUNICATIONS

FIELD OF THE INVENTION

This invention relates in general to communication systems, and more specifically to a method and apparatus for providing and detecting a preamble that is used to initiate a communications exchange between wireless equipment.

BACKGROUND OF THE INVENTION

In radio communication systems it is normally necessary for a receiver to determine whether a transmitter is trying to initiate a communication. In such systems where the transmitter is normally active or systems where the air interface includes scheduling information, this issue is readily resolved. However in systems using an asynchronous protocol for communications, determining whether a communication is desired in an efficient manner is still a significant problem. This problem is further exacerbated where the particular frequency for the communications is unknown and by frequency mismatches between the transmitter and receiver, particularly for battery life sensitive applications. The power consumed in monitoring for an asynchronous communication from another device to determine whether an attempt to communicate has occurred may significantly reduce the battery life and thus available service time of the mobile unit. Clearly a method and apparatus are needed for identifying when communications are desired, preferably in a time and power efficient manner given frequency offsets between communications devices.

BRIEF DESCRIPTION OF THE DRAWINGS

The accompanying figures, where like reference numerals refer to identical or functionally similar elements throughout the separate views and which together with the detailed description below are incorporated in and form part of the specification, serve to further illustrate various embodiments and to explain various principles and advantages all in accordance with the present invention.

DETAILED DESCRIPTION OF PREFERRED EMBODIMENT

In overview, the present disclosure concerns wireless communications devices that support two-way communication. More particularly various inventive concepts and principles embodied in methods and apparatus for effectively identifying an initiation of a communication message, preferably asynchronous communications message, between two radios, such as portable wireless communication devices, even when a frequency mismatch exists between a receiver and a transmitter, are discussed. The wireless communications devices of particular interest are those using frequency shift keying and a frequency hopping protocol, although the inventive principles and concepts apply to various devices using various forms of modulation.

As further discussed below, various inventive principles and combinations thereof are advantageously employed to use new and existing facilities within the wireless communication device so as to provide efficient identification of a preamble or specialized preamble message thereby minimizing power drain. This is accomplished while providing a frequency mismatch estimate for adjusting the communications device frequency to match the transmitter originating the transmissions.

The instant disclosure is provided to further explain in an enabling fashion the best modes of making and using various embodiments in accordance with the present invention. The disclosure is further offered to enhance an understanding and appreciation for the inventive principles and advantages thereof, rather than to limit in any manner the invention. The invention is defined solely by the appended claims including any amendments made during the pendency of this application and all equivalents of those claims as issued.

It is further understood that the use of relational terms, if any, such as first and second, top and bottom, and the like are used solely to distinguish one from another entity or action without necessarily requiring or implying any actual such relationship or order between such entities or actions.

Much of the inventive functionality and many of the inventive principles are best implemented with or in software programs or instructions and integrated circuits (ICs) such as application specific ICs. It is expected that one of ordinary skill, notwithstanding possibly significant effort and many design choices motivated by, for example, available time, current technology, and economic considerations, when guided by the concepts and principles disclosed herein will be readily capable of generating such software instructions and programs and ICs with minimal experimentation. Therefore, in the interest of brevity and minimization of any risk of obscuring the principles and concepts in accordance to the present invention, further discussion of such software and ICs, if any, will be limited to the essentials with respect to the principles and concepts of the preferred embodiments.

Figure 1:
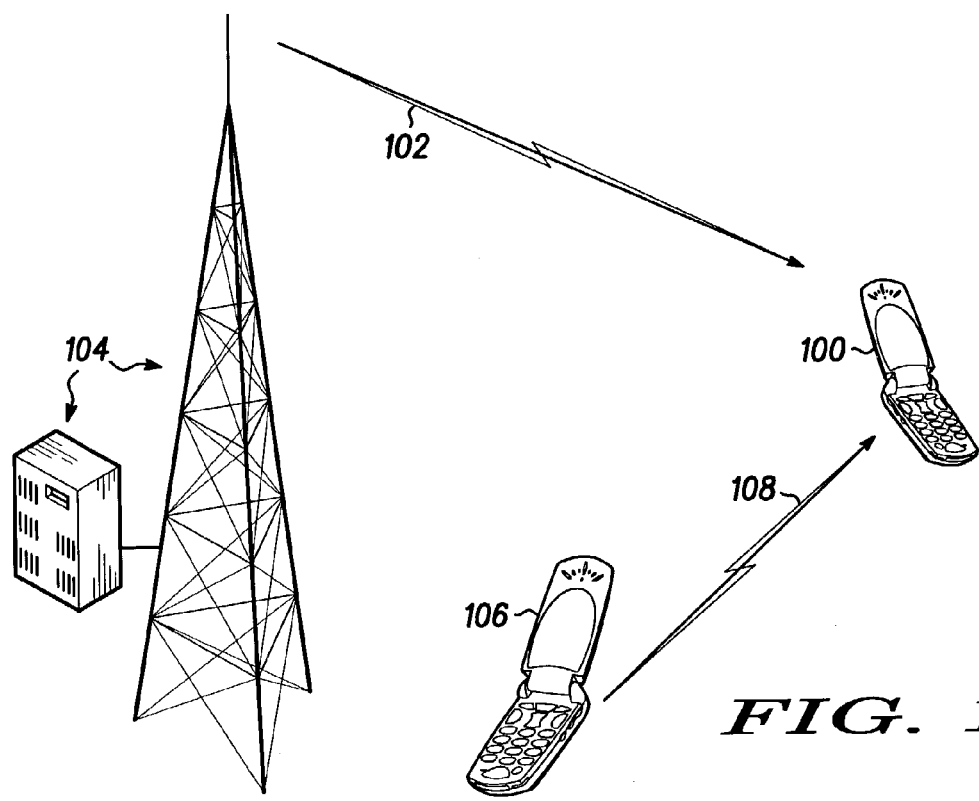
FIG. 1 depicts, in a simplified and representative view, the system elements of a wireless communications environment.

Referring to FIG. 1, a simplified and representative view of various system elements of a wireless communications environment will be discussed and described. A wireless communication device 100 is able to receive a signal 102 from a fixed transmitter 104 as well as a signal 108 from another wireless communication device. The frequency of the received signal 102, 108 is directly related to or determined by the frequency of a signal provided by a signal source to the transmitters of the wireless communications devices 104, 106. This frequency will likely be different from the frequency of a corresponding signal source in the receiver of the wireless communication device 100. The difference between these two frequencies translated to the nominal channel frequency or the frequency that the signal on the channel is supposed to be at is called or referred to as the frequency mismatch between the transmitter and receiver. This frequency mismatch in part or in combination with other non-ideal characteristics in the wireless communication device can result in missed communications attempts. For example, this frequency mismatch for carriers in the 900 MHz range can be as much as 9 KHz if both signal sources have a 5 part per million tolerance and this is typical for the wireless communication devices 100, 106. This large frequency offset particularly arises when the wireless communications devices 100, 106 are engaged in talk around or direct communications as suggested by the signal 108. The large frequency offset encountered in direct communications scenarios is further exacerbated since these communications are ordinarily entirely asynchronous. In asynchronous communications the receiver has no indication when the transmitter will attempt a communication. Another issue with asynchronous communication is that clock synchronization is not routinely available and the wireless communication device 100 must use a methodology to overcome any timing offsets between the respective clocks. The infrequent and unpredictable nature of direct communication makes it impractical to use synchronous communication methods, mainly due to the power drain on portable unit batteries to maintain frequency and timing synchronization. In an asynchronous environment, the burden of identifying a valid signal and correcting for frequency and timing mismatches falls on the receiver. The concern for battery life requires that special consideration is paid to minimize the length of time a wireless receiver must be active when detecting an asynchronous communication as well as minimizing the processing steps required to analyze an incoming signal for a message identifier that indicates an asynchronous communication attempt has been made.

Mitigation of frequency offset, timing offset and power-efficient message identifier detection are achieved when the wireless communication device and its component wireless receiver are arranged to operate as described below. The wireless communication device 100 can be a typical cellular telephone or handset such as those available from manufacturers, such as Motorola. One such handset, commonly referred to as the model i95, can advantageously utilize the principles and concepts when enhanced as described in the following disclosure. The essential elements of the transmitter of FIG. 2 can be used in both fixed transmitters 104 and portable wireless communication devices 106. The transmitter 200 is common to communications infrastructure systems similar to Integrated Digital Enhanced Network equipment available from Motorola and utilized in networks operated by service providers, such as Nextel Communications. Alternatively, the transmitter 200 is included in a second portable wireless handset, wherein both handsets are configured to communicate directly with one another in a direct communication mode as noted above.

Figure 2:
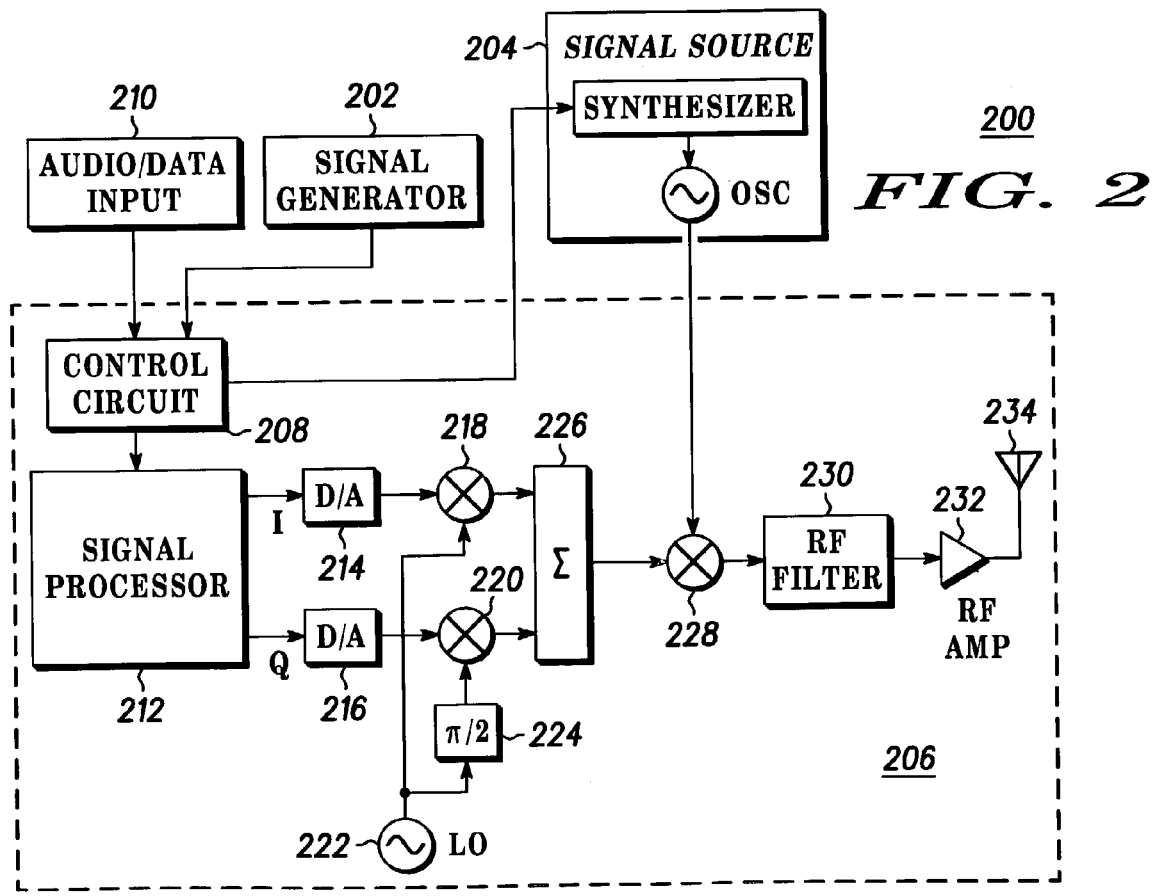
FIG. 2 depicts, in an exemplary form, a block diagram of a transmitter arranged to transmit a preamble signal.

Referring to FIG. 2, an exemplary block diagram of a transmitter 200 arranged to transmit a preamble signal is discussed and described. The transmitter 200 comprises a signal generator 202, a signal source 204, a transmitter circuit 206, a control circuit 208, and an audio/data input 210 inter coupled as depicted. The transmitter circuit 206 includes a control circuit 208 that is coupled to and is capable of selecting whether audio/data from the audio/data input 210 or a preamble or preamble signal or message identifier generated by the signal generator 202 will be coupled to and transmitted or broadcast by the transmitter 200. The block diagram is depicted in this fashion for clarity. In alternative embodiments the functions of certain entities, such as the signal generator 202, control circuit 208 and a portion of the audio/data input may be included along with others in a signal processor 212. The control circuit 208 is coupled to and controls the signal source 204 to set the carrier frequency of the transmitter 200. The signal processor 212 outputs I and Q digital signal pairs to drive the digital to analog (D/A) converters 214, 216. The analog outputs of the D/A converters 214, 216 are combined in the mixers 218, 220 with an injection signal from a local oscillator 222. The local oscillator is coupled directly to a mixer 218 and through a phase shifter 224 that shifts the phase of the injection signal by $\pi/2$ radians to a mixer 220. The outputs of the mixers 218, 220 are added in a summing circuit 226 and the combined output is mixed onto or up converted to a radio frequency signal with a carrier frequency that is established by the signal source 204. An RF filter 230 limits the sidebands and a final amplifier 232 increases the power of the modulated carrier for broadcast from an antenna 234.

The components in the transmitter 200 and operation thereof are well known and available, with the exception of the signal generator. The signal source 204 may be a fractional-N synthesizer. The mixers 218, 220, 228, filter 230, amplifier 232, digital to analog converters, 214, 216, phase shifter 224 and summing circuit 226 are all commercially available and known in the art. The signal processor 212 is or may include a digital signal processor. Such a device, in an exemplary design may be one of several devices from manufacturers such as Motorola, Inc. The control circuit 208 and signal generator may be a standalone circuit, such as a commercially available field programmable gate array or, as mentioned above, may be included in the signal processor 212 and implemented in or facilitated by a software program. The signal generator 202, can be implemented in hardware using, for example, a field programmable gate array coupled to a system level clock (not shown) to provide the preamble signal according to the details provided below. Alternatively the preamble can be provided at least in part by the signal processor.

In operation, the transmitter 200 is arranged to transmit a preamble signal to wake up target receivers where the transmitter 200 comprises the signal generator 202 for creating the preamble signal. The preamble signal comprises a data sequence that is periodic over a preamble period and repeated during a plurality of time periods or time slots. The transmitter 200 also comprises the signal source 204 that provides a signal that establishes the transmitter operating frequency as a unique and predetermined frequency during each of the plurality of time slots or periods. The transmitter further includes the transmitter circuit or apparatus 206 that is coupled and responsive to the signal source 204 to transmit the signal modulated by the preamble signal during the plurality of time periods. The transmitter 200 is an element of a two-way radio system. In one embodiment it may be a part of a standalone, fixed base unit 104. In another embodiment the transmitter 200 can be part of a portable transceiver 106 arranged for direct portable-to-portable communications.

The transmitter 200 and the herein described preamble signal are particularly applicable to systems using continuous-phase frequency shift key (CPFSK) modulation of a carrier signal. Furthermore this type of carrier can as here be used in frequency hopped systems where the frequency of the transmission or frequency of the carrier is changed to a different frequency in a succession of time slots, for example 64 time slots of 90 milliseconds each. Each time slot is used to transmit a coded signal. In an exemplary embodiment, the first three slots are used to transmit the preamble signal with predetermined characteristics for use by a receiver 300 in detecting the presence of the transmission. In a further exemplary embodiment, the first three slots for transmitting the preamble signal are always on the same three predefined frequencies.

Figure 4:
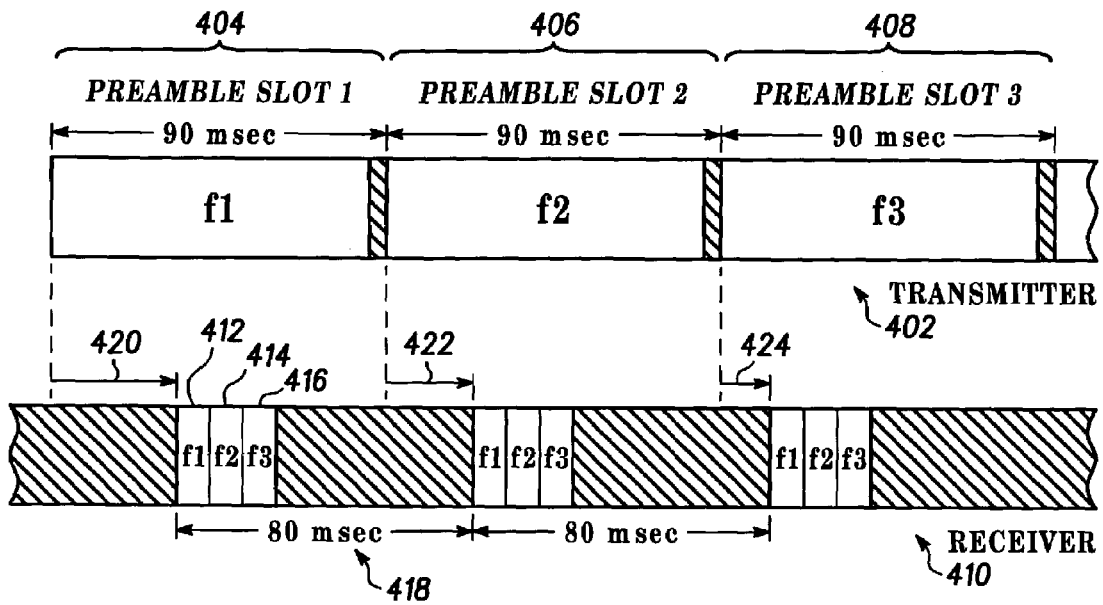
FIG. 4 illustrates a transmitter signal pattern and an associated receiver sampling pattern.

Referring briefly to FIG. 4, the exemplary sequence of the preamble data transmission 402 shows the first three slots of data transmission. The first nominal 90 millisecond slot 404 is at frequency f1, after a brief pause, for example, 2.5 milliseconds for the transmitter to change frequencies, a second nominal 90 millisecond transmission 406 is made at frequency f2. Following a similar brief pause, a third nominal 90 millisecond transmission 408 is made at frequency f3. The frequencies f1, f2, and f3 are known by the transmitter 200 and by an exemplary receiver 300. Third order diversity of the preamble detection system is achieved when the frequencies f1, f2, and f3 are chosen to be sufficiently well spaced throughout the available frequencies in the set of frequencies or hop set. As is known if the frequencies are sufficiently different from each other cancellation of the signal at one frequency will not be correlated to cancellation at another due to multi-path interference. Another goal of transmitting on three frequencies in an exemplary system is that a receiver 300 monitoring the transmission will have at least one clear signal to analyze for the preamble. FIG. 4 will be explained further below.

The choice of the preamble waveform or signal or modulation is particularly relevant in an exemplary embodiment. The data sequence of the preamble transmission is selected and then adjusted, if required, with a predetermined frequency offset so the preamble signal traverses an integer number of full periods and when using phase shift modulation preferably an integer multiple of $2\pi$ radians over the preamble period. The modulation of the preamble transmission may be a data sequence comprising a tone or plurality of individual tones. The use of two or more tones in an exemplary design reduces the probability of falsely interpreting a spurious signal as a valid preamble signal. The data sequence may also be selected or chosen from a code set chosen to exhibit low cross-correlation with other codewords for both time offset and frequency offset. A code set comprising a non-binary cyclic Bose-Chaudhuri-Hocquenghem (BCH) code of odd length is such a code. The use of BCH codes for coding data in a data transmission is common, but the use of such codes for modulation where the code does not represent data as such, but is useful as a preamble signal because of its low cross correlation is novel and especially advantageous.

A frequency shift keyed (FSK) signal can be written in terms of its complex baseband envelope $$s(t,u) = \exp[j\phi(t,u)] \quad \text{Eq. 1}$$

where u is the transmitted symbol sequence. For M-ary FSK, each element $u_i$ of the data sequence is contained in the symbol set $$u_i \in [1-M, 3-M, \ldots, M-3, M-1] \quad \text{Eq. 2}$$

It is not required that the data symbol set follow this format, i.e., a non-uniform frequency deviation may be chosen. In any case, the phase of a continuous-phase FSK (CPFSK) signal at the end of the symbol period is given by $$\phi(iT, u) = \pi h \sum_{i=0}^{i-1} u_k \quad i \geq 1 \quad \text{Eq. 3}$$

where h is referred to as the modulation index, and T is the symbol interval. In this expression the assumption is that the preamble transmission begins at time t=0 and, without loss of generality, that the phase at time t=0 is zero radians.

In a preferred embodiment, the preamble signal is generated by transmitting a known, length-N symbol sequence $u_0$ repeatedly through each of the predetermined preamble time slots. The change in phase over the duration of one N-symbol interval is $$\phi(NT, u_0) = \pi h \sum_{i=0}^{N-1} u_{0,i} \mod 2\pi \quad \text{Eq. 4}$$

For example, one embodiment may use an odd-length, M-ary sequence with h=1 that will have a phase change of $\phi(NT, u_0)=\pi$ radians while any M-ary sequence with h=2 will have a phase change of $\phi(NT, u_0)=2\pi$ radians.

Figure 5:
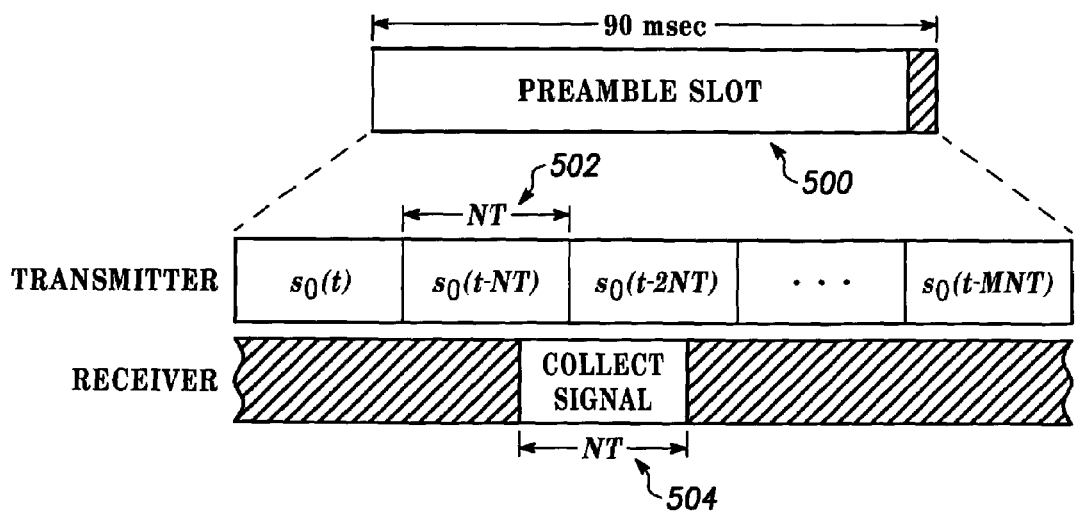
FIG. 5 illustrates a transmitter signal pattern showing, in more detail, the FIG. 4 transmitter preamble slot and associated receiver sample collection timing.

Referring briefly to FIG. 5, a transmitter signal pattern showing in more detail the FIG. 4 transmitter preamble slot and associated receiver sample collection timing will be covered in the context of the current discussion. An exemplary preamble time slot 500 is detailed to show a scenario in which a known preamble waveform that is periodic is transmitted repeatedly throughout the slot. This known preamble waveform, denoted as $s_0(t)$ 502 has a duration of NT seconds, where T is the symbol duration, in seconds, and N is the preamble detection interval, in symbols. The receiver 300 wakes up and collects samples of the signal for at least an integer multiple of NT seconds, i.e., it collects at least one complete period of the preamble signal. The receiver 300 will be discussed in more detail in the discussion of FIG. 3.

The repeated transmission of the length-N preamble data sequence $u_0$ through a CPFSK modulator results, in a nominal embodiment, in a waveform with period NT. As will be discussed shortly, from a receiver signal processing point-of-view, it is desirable that the signal have period NT, as illustrated in FIG. 5. Repeated transmission of a length-N data sequence through a CPFSK modulator doesn't necessarily generate a signal with period NT seconds. This was demonstrated in Eq. 4, where an odd-length sequence through a CPFSK modulator with h=1 undergoes a phase change of $\pi$ radians over the course of the data sequence. The CPFSK signal can be forced to have period NT seconds by applying a small frequency offset to the preamble signal, so that a phase change of $2\pi$ radians is attained over the course of the length-N data sequence. For example, applying Eq. 4, in the case of a length-9, M-ary sequence, with h=1, and a symbol rate of 3200 baud, there is a phase change of $\pi$ radians over the course of this data sequence. To force another $\pi$ radians of phase shift, and attain a total change of $2\pi$ radians, and, thereby, a waveform with a period equal to 9/3200 seconds, an intentional frequency offset is applied equal to:

$$\Delta f_0 = \frac{1/2 \text{ cycle}}{9/3200 \text{ seconds}} = 177.777 \text{ Hz} \quad \text{Eq. 5}$$

This demonstrates one exemplary method of generating a preamble waveform with period NT seconds by repeatedly transmitting an arbitrary length-N data sequence through a CPFSK transmitter 200 with a small intentional frequency offset. As a result, a receiver 300 will be presented with a circular shift 504 of the transmitted preamble signal $s_0(t)$ 502, as illustrated in FIG. 5.

In one embodiment a simple choice of the data sequence $u_0$ is a sequence of the same symbol repeated N times, resulting in a single-tone preamble signal. This is not a desirable choice, since any spurious tone, etc., may false the receiver, and incorrectly wake it from a power conservation mode. In another embodiment, a choice is the length-8 sequence of the form $$u_0 = [+D+D+D+D-D-D-D-D] \quad \text{Eq. 6}$$

which toggles between two tone frequencies. The choice of the symbol value D should be based on the hardware involved, and the frequency error that is expected. For example, if large local oscillator errors are expected, and an exemplary receiver 300 employs analog filters 348, 346 with a limited passband, then the symbol value D should be chosen to be small enough, so that the signal does not land in the transition band of the analog filters.

In another embodiment, the preamble or preamble sequence may chosen from a code set comprised of multiple sequences. It has been determined that cyclic codes, such as non-binary BCH codes, provide good distance among the code set in the presence of time and frequency offset from one another. These sequences are always odd-length, so, if h=1 is used (or any other mod index which produces a non-periodic signal), the offset adjustment described above may be used to produce the signal of the desired characteristic. The signal processing elements described below apply to a tone signal of single or multiple tones, or the BCH code set.

Figure 3:
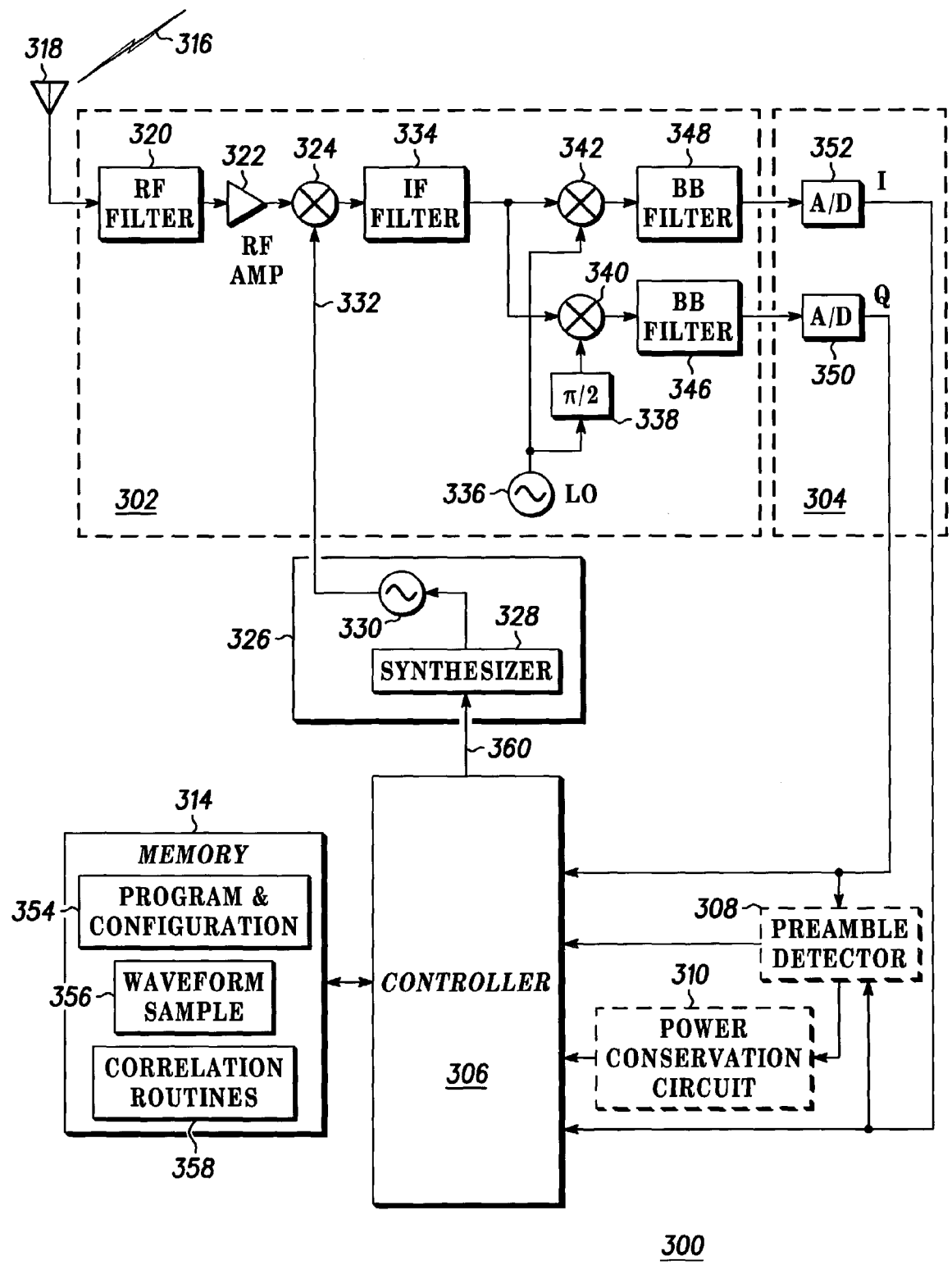
FIG. 3 depicts, in an exemplary form, a block diagram of a wireless receiver arranged to detect a preamble signal.

Referring to FIG. 3, an exemplary block diagram of a wireless receiver 300 arranged to detect a preamble signal will be discussed and described. The wireless receiver 300 is a component of the wireless communication devices 100, 106 and is comprised of one or more components or elements that in practice can exhibit non-ideal characteristics such as frequency instability. These non-ideal characteristics arise from the statistical nature and variation of the components used in the construction of the wireless receiver 300, environmental factors such as battery voltage level and temperature, and other unplanned interactions among elements of a real receiver.

There are several impacts of variability on the wireless receiver. Among them may be frequency variation. Frequency variation is often the result of the inherent variations of the components comprising and surrounding a signal source and other factors such as temperature and component changes with age. Frequency variation will cause a received signal to be shifted above or below an intended frequency. It is then necessary to mitigate the effects of the frequency variation when processing a received signal. Another impact of the wireless receiver 300 that must be overcome, particularly in the asynchronous environment is clock timing synchronization.

The wireless receiver 300 is arranged for using or detecting the preamble signal as discussed above or a similar specialized preamble message and comprises a receiver 302 coupled to a sampler 304 for providing a plurality of received sample sequences to a controller 306, normally including a digital signal processor (DSP). A preamble detector circuit 308 and power conservation circuit 310 may be standalone circuits or implemented as functions of the controller 306. The preamble detector 308 operates as described below. The power conservation circuit 310 operates to reduce the power consumption of the wireless communication device 100 by removing or reducing the power to non-essential circuits or reducing their clock rate to correspondingly reduce their power consumption during periods of inactivity or reduced activity. The power conservation circuit 310 operates to reduce power usage when the wireless receiver 300 is only monitoring for a preamble signal or the wireless communication device 100 is in another low power mode. The controller 306 is coupled to a memory 314 comprising volatile and non-volatile memory.

The receiver 302 receives a signal 316 comprising a preamble signal at antenna 318. The received signal is shaped by a radio frequency filter 320 that operates to reject out of band energy of the received signal and this signal is then amplified by an RF amplifier 322. The signal is further processed at a mixer 324. A signal source 326 comprises a synthesizer 328 and voltage controller oscillator 330. The synthesizer 328 is referenced to oscillator (not shown) that is typically specified to be stable within 5 ppm (parts per million). The synthesizer 328 controls the frequency of the voltage controller oscillator 330 to produce an injection signal 332 for combining with and down converting the received signal at the mixer 324. The resulting intermediate frequency signal is shaped by an IF filter 334. In an exemplary digital receiver, the signal is split and mixed to two base band signals.

The frequency of the injection signal 332 may match or nearly match the received signal in the case of a zero intermediate frequency receiver or be deliberately offset an amount equal to an intermediate frequency, such as 13.7 megahertz. It is understood in the discussions below where the signal source is adjusted to allow the injection frequency to correct for a frequency mismatch with the received signal that it is in this context.

More specifically a second oscillator 336 produces a second injection frequency which is provided in a 90 degree shifted version for mixing with the intermediate frequency signal at mixer 340 and an unshifted version for mixing with the intermediate frequency signal at mixer 342. The resulting base band signals, normally referred to as I and Q signals are filtered by base band filters 346 and 348 respectively. These outputs of the receiver 302, specifically the output signals from the base band filters are provided to the sampler 304 as depicted. The sampler comprises analog-to-digital converters 350 and 352.

The analog-to-digital converters produce I and Q outputs that are digital signals and that are coupled or sent to the preamble detector 308 and the controller 306 or just the controller 306 depending on the implementation configuration.

The controller 306 is also coupled to or includes the memory 314 that is used for storing program instructions and configuration data 354, algorithms, such as correlation routines 358, as well as waveform samples 356 or information corresponding thereto that is used in the further processing of the received signal as well as a plurality of other routines that will be obvious to one of ordinary skill but that are not relevant for our purposes. The controller 306 is coupled to the signal source 326 and is operable to adjust the frequency of the signal source 326 by a control signal 360.

The structural elements of the wireless receiver 300 are generally known and available and may be modified to operate and function in accordance with the inventive principles and concepts disclosed herein. The signal source 326 may be, for example, a fractional-N synthesizer. The mixers 324, 340, 342, filters 320, 334, 346, 348, amplifier 322, oscillators 330, 336, phase shifter 338, and analog-to-digital converters 350, 352 are all commercially available and known in the art. In the exemplary case where the controller 306 is or includes a DSP, various devices are known and available from manufacturers such as Motorola, Inc. The memory 314, comprising volatile and non-volatile memory is also commercially available and known and may be included in total or part with the processor. The preamble detector 308, if implemented in software, will be implemented in or facilitated by the DSP or processor. When the preamble detector 308 is implemented in hardware a number of commercially available field programmable gate arrays or the like are suitable for performing the tasks, given the principles and concepts disclosed herein. Implementing a DSP task in logic hardware is known in the art and can be accomplished by one of ordinary skill in the art without undue experimentation given the discussion and explanations herein. The power conservation circuit 310 may be implemented by a commercially available field programmable gate array or in the DSP depending on the number of available controllable outputs on the DSP and the power reduction requirements of the circuitry under control.

In operation, the wireless receiver 300 is arranged to detect a preamble signal, such as the preamble described above and to exit a standby low power mode or the like when the preamble is detected. The wireless receiver 300 comprises a receiver 302 for scanning, asynchronously and sequentially during a wakeup time, a plurality of predetermined frequencies for the preamble signal. Referring briefly to FIG. 4, the representative receiver (Rx) sample timing 410 will be discussed. The receiver 302 collects three samples or sample sequences at time interval 412, 414, and 416 at the three predetermined preamble frequencies, in this case, labeled f1, f2, f3. The actual frequencies depend on the band of the receiver and the diversity considerations discussed above but can be experimentally determined given appropriate governmental regulations and the like. The receiver 302 may take these samples, for example for 2.5 milliseconds each, beginning at an unknown time relative to the beginning of the transmit cycle, as shown by the offset 420. While the drawing is not to scale for readability it can be seen that if the receiver collected samples at exactly the same period as the transmitted slot, in this case 90 milliseconds, and the offset 420 was such that the sample sequences were taken during the transmission gap between frequencies, one or more of the sample sequences taken in time intervals 412, 414, 416 might be taken at a time when there was no transmission and the preamble signal would be missed. In one embodiment, the receiver 302 sampling period is set to a slightly shifted rate, in this case every 80 milliseconds, so the subsequent sample periods are shifted from the transmission periods, that is 422 and 424 are closer to the beginning of the corresponding transmitter transmission period, helping to ensure that each of the preamble frequencies will be available to the receiver 302 in at least one of the transmission periods.

Returning to FIG. 3, the wireless receiver 300 also comprises the sampler 304, coupled to the receiver 302, for collecting a plurality of received sample sequences, with one received sample sequence collected at each of the plurality of predetermined frequencies. In one embodiment, the 3 time periods 412, 414, 416 are each 2.5 milliseconds (ms) long and this corresponds to an integer number of periods of the preamble signal or waveform 502. Note that the received signal or preamble signal when present in the digital receiver embodiment is comprised of a sequence of samples, specifically I/Q sample pairs taken over the 2.5 ms window at a sampling rate of, preferably, 51,200 samples per second or 128 I/Q sample pairs in each 2.5 ms time period or observation interval. Thus a received signal sample sequence is comprised of a multiplicity of samples of a received waveform or a received sample sequence that is collected over one of the 2.5 ms time periods.

The wireless receiver 300 also comprises the controller 306 coupled to the receiver 302 and sampler 304 for performing a correlation based on stored routines 358 between data corresponding to the preamble signal stored in memory 356 and data corresponding to a received sample sequence to provide a correlation result and for comparing the correlation result to a threshold value, also stored in memory 314 to determine when the preamble signal has been detected. A power conservation circuit 310 coupled to the controller 306 operates to reduce the power consumption of the wireless receiver 300 until notified by the controller, specifically preamble detector, that the preamble signal has been detected. As discussed above, the sampler 304 is operable to collect one of the plurality of received sample sequences during each of the times 412, 414, 416 or for a predetermined time period, in an exemplary case 2.5 milliseconds. The preamble signal is periodic over an integer multiple of N symbols thus predetermined time period as shown above in the discussion related to Eq. 4 and Eq. 5.

Employing an optimum detection methodology requires that the preamble signal be synchronized in both time and frequency with the wireless receiver 300. The controller 306 is operable to estimate a frequency offset between one of the received sample sequences and a nominal frequency of the signal source 326 by locating a peak of a correlation of a magnitude squared value of a Fast Fourier Transform of the received sample sequence and a magnitude squared value of a Fast Fourier Transform of an expected preamble signal where the expected preamble is stored in the memory 356. This peak in the correlation results in or provides a frequency offset or estimate that can be used to adjust the received sample sequence according to the frequency offset to create an adjusted received sample. Then a a circular time-domain correlation between data corresponding to the preamble signal and the adjusted received sample sequence is calculated to provide the correlation result.

An exhaustive and straight forward computation of these values may still be deemed impractical given in the time available using controller 306 while still meeting other requirements of cost and power consumption. If so the use of an ad hoc frequency estimator and a single search of the correlation for time offset is proposed and recommended for the exemplary embodiment.

The preamble detection algorithm or process works on a fixed number $NN_s$ of complex samples of the received signal, where N is the preamble period in symbols, and $N_s$ is the number of samples per symbol. Usually, $NN_s$ should be chosen to be a power-of-2, so that standard Fast Fourier Transform (FFT) techniques can be employed. In one exemplary embodiment, the controller 306 first computes a zero-padded FFT of the received signal or received sample sequence, and takes the magnitude-squared:

$$P_r(l) = \frac{1}{2}\left|\frac{1}{N_s N}\sum_{k=0}^{N_s N - 1} r_k e^{-j\frac{2\pi k l}{2N_s N}}\right|^2 \quad l = 0, 1, \ldots 2N_s N - 1 \qquad \text{Eq. 7}$$

This computation has a frequency resolution that is twice that of the standard non-zero-padded FFT, where the frequency resolution of the standard FFT or DFT is equal to the inverse of the observation interval or time period over which the sequence of samples are collected. Where this time period is 2.5 msec the standard resolution is 400 Hz and using the zero padded FFT this is improved to 200 Hz. It has been experimentally shown that doubling the frequency resolution to $2NN_s$ points over the actual samples collected during the sampling period provides a dramatic performance improvement in the ad hoc frequency estimation.

The magnitude squared value of the expected preamble signal, including any intentional frequency offset added at the transmitter, as described above, is pre-computed. The length of this template matches the zero-padded length of the received signal, $2NN_s$.

$$P_s(l) = A_s \left| \sum_{k=0}^{N_sN-1} s_{0,k} e^{-j\frac{2\pi k l}{2N_sN}} \right|^2 \quad l = 0, 1, \ldots 2N_sN - 1 \qquad \text{Eq. 8}$$

The matched filter correlation in the frequency domain is computed:

$$C_f(l) = \sum_{m=0}^{2N_sN-1} P_r(m) P_s((m+l) \bmod 2NN_s) \quad -L_{max} \leq l \leq L_{max} \qquad \text{Eq. 9}$$

where $L_{max}$ is chosen according to a pre-determined frequency offset range based on system parameters contributing to a expected maximum frequency offset. The frequency offset is then estimated as:

$$\hat{\omega}_e = \frac{\pi}{NN_s} \cdot frac\ \text{argmax}_l\ [C_f(l)] \text{ radians} \qquad \text{Eq. 10}$$

where the "fracargmax" denotes the fractional argument of l which maximizes $C_f(l)$ or the peak of the correlation in Eq. 9. One simplification of the correlation in Equation 9 is available. The data corresponding to the preamble signal can be clipped to limit the number of non-zero elements thereby reducing the number of computations to estimate the frequency offset as follows:

$$P'_s(l) = \begin{cases} P_s(l) & \text{if } P_s(l) > \eta_s \\ 0 & \text{if } P_s(l) \leq \eta_s \end{cases} \qquad \text{Eq. 11}$$

where $\eta_s$ is a predetermined threshold value. While this dramatically decreases the number of computations, there is no noticeable degradation in the accuracy of the frequency offset estimate, especially for the case of the 2-tone preamble.

Using the frequency offset estimate of Eq. 10 the received sample sequence is corrected for frequency offset:

$$x_k = r_k e^{-j\hat{\omega}_e k} \quad k = 0, 1, \ldots, N_s N - 1 \qquad \text{Eq. 12}$$

The preamble signal is constructed at the transmitter 200 such that the received preamble signal exhibits a circular shift of the preamble signal with arbitrary starting phase as was noted above. Next, the controller 306, using correlation routines 358, performs a circular time-domain correlation between the data corresponding to the preamble signal, in this case a conjugate of $\{s_{0,k}\}$, and the adjusted received sample sequence $\{x_k\}$ to provide the correlation result. Both sequences are complex, so a brute-force computation would be computationally intensive. The use of a Discrete Fourier Transform (DFT) may be used to reduce the complexity of the computation. Take a pre-computed DFT of the desired signal $$S_l = \sum_{k=0}^{N_sN-1} s_{0,k} e^{-j\frac{2\pi k l}{N_sN}} \quad l = 0, 1, \ldots, N_sN - 1 \qquad \text{Eq. 13}$$

A Fast Fourier Transform is used to compute the Discrete Fourier Transform of the frequency corrected signal $\{x_k\}$:

$$X_l = \sum_{k=0}^{N_sN-1} x_k e^{-j\frac{2\pi k l}{N_sN}} \quad l = 0, 1, \ldots, N_sN - 1 \qquad \text{Eq. 14}$$

Thus, computing an inverse Discrete Fourier Transform of the product of a Discrete Fourier Transform of the adjusted received sample and a conjugate Discrete Fourier Transform of the data corresponding to the preamble signal gives the circular time-domain correlation of the two:

$$c_k = \frac{1}{N_sN} \sum_{l=0}^{N_sN-1} S_l^* X_l e^{j\frac{2\pi k l}{N_sN}} \quad k = 0, 1, \ldots, N_sN - 1 \qquad \text{Eq. 15}$$

By insuring that the preamble signal is periodic over the proper time frame, it enables the use of a circular correlation over time, which is efficiently calculated using the DFT. The fact that the correlation may start on any point in the signal allows correlation of N symbols with the minimum receiver "on" time, reducing the battery requirements for preamble detection.

The correlation result is compared to metrics for the preamble signal using threshold tests. The controller 306 is operable to compare the correlation result to a first threshold value corresponding to a wide-band noise metric defined as:

$$C_1 = \max_k \left( \left| \frac{c_k}{N_sN} \right|^2 \right) \qquad \text{Eq. 16}$$

This metric is normalized by the power in the received samples. Using Parseval's relation:

$$\sum_{l=0}^{2N_sN-1} P_r(l) = \frac{1}{N_sN} \sum_{k=0}^{N_sN-1} |r_k|^2 \qquad \text{Eq. 17}$$

the normalization factor is defined as the relevant power in the received samples, accounting for the frequency offset of the received samples:

$$P_n = \sum_{l=l_1}^{l_2} P_r(l) \qquad \text{Eq. 18}$$

If all the energy is used, the metrics get small when the signal-to-noise ratio is low so this allows use of a high threshold, avoiding problems in distinguishing undesired signals received at high signal-to-noise ratios.

In an embodiment where the preamble signal is modulated with a BCH code set the only requirement for threshold testing is:

$$C_1 \geq \eta_1 P_n \qquad \text{Eq. 19}$$

where $\eta_1$ is a pre-determined threshold based on system implementation criteria and experimental results. The low cross correlation between undesired codes is relied upon to reduce false detections.

In another embodiment, the controller 306 is operable to compare the correlation result to a second threshold value corresponding to a narrowband noise metric when, for example, the preamble signal comprises a plurality of tones. This extra test reduces false detections on narrowband signals. A narrowband metric in such an embodiment may be:

$$C_2 = \max_{l \in L} \left( \left| \frac{X_l}{N_s N} \right|^2 \right) \qquad \text{Eq. 20}$$

where L is the relevant subset of the received signals frequency spectrum. Passing the narrowband metric requires that $$C_1 \geq \eta_2 C_2 \qquad \text{Eq. 21}$$

where $\eta_2$ is a second predetermined threshold that is implementation specific and based on system configuration and environmental factors.

FIG. 4, a transmitter signal pattern and an associated receiver sampling pattern has been discussed in some detail above. In review, a transmitter 200 is arranged for sending a preamble signal as part of a transmission sequence 402. The transmission sequence is divided into equal time slots where the signal at each time slot is broadcast at a different frequency. In the exemplary case discussed, the identical preamble signal is broadcast during the first three 90 millisecond time slots 404, 406, 408 of a transmission at known frequencies f1, f2 and f3. Other applications are easily envisioned where the duration of time slots vary and the number dedicated to the preamble may change based on frequency band, criticality of the message being sent and environmental considerations.

A wireless receiver 300 is arranged to operate in conjunction with the transmitter 200. The wireless receiver monitors a channel as represented by the diagram 410. The wireless receiver wakes briefly to monitor each of the three frequencies f1 412, f2 414 and f3 416 used for preamble transmission. The receiver wake up period, in this exemplary case, 80 milliseconds is chosen so the timing of the monitoring processes in the receiver are offset from the timing of the transmitter sequence to improve the likelihood the receiver will capture at least one good sample of the preamble signal at one of the three sampling periods.

Referring to FIG. 5, a transmitter signal pattern showing a detail of the FIG. 4 transmitter preamble slot and associated receiver sample collection timing will be reviewed. As described above, a preamble slot 500 is used to repeatedly broadcast a preamble signal $s_0(t)$ 502 of duration NT seconds, where T is the number of seconds/symbol and N is the number of symbols/preamble period. A corresponding receiver will sample the preamble signal for an integer number of preamble periods. In one embodiment, the receiver samples for only NT seconds 504 to minimize the power drain of the wireless receiver 300.

Figure 6:
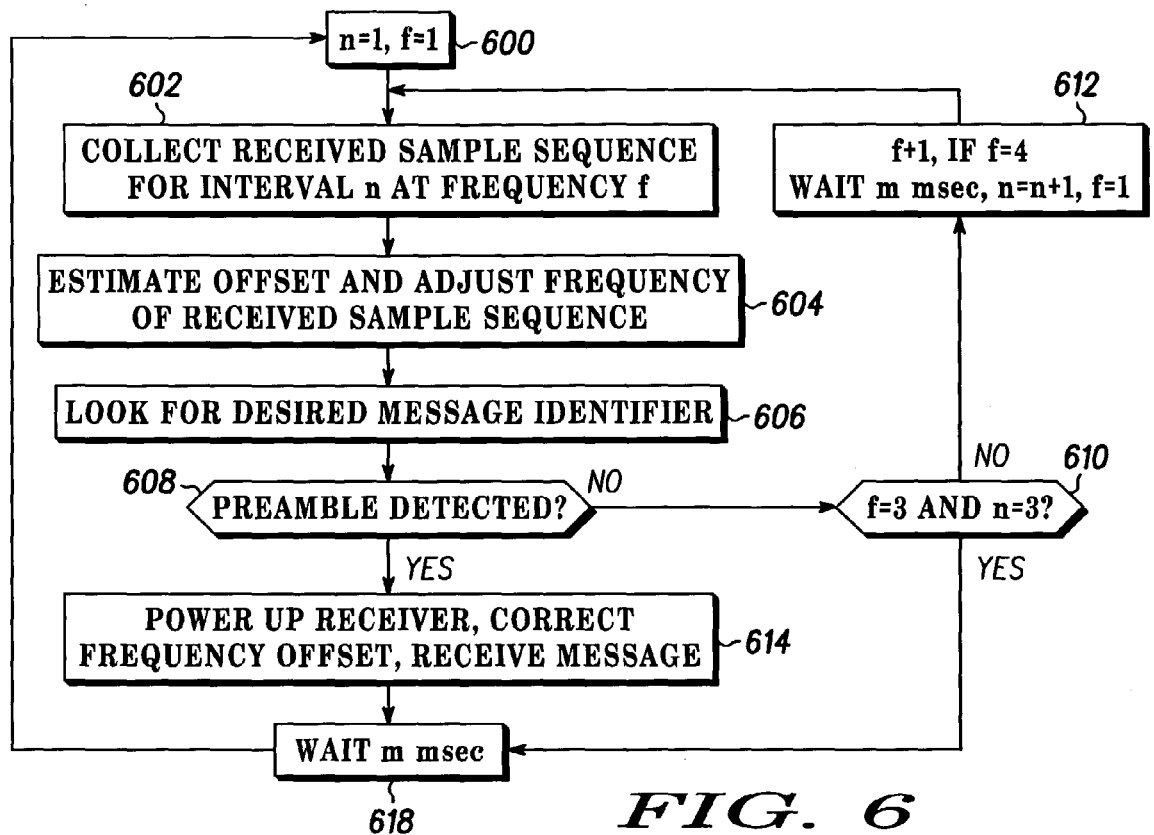
FIG. 6 depicts a flow chart of a method to detect a message identifier in a wireless receiver.

Referring to FIG. 6 a flow chart of a method to detect a message identifier or preamble in a wireless receiver will be discussed and described. An initial condition 600 is set up in a wireless receiver 300. A counter for frequency f and another counter for time slot t are initialized to zero. The wireless receiver 300 then begins scanning, asynchronously and sequentially during a wakeup time, a plurality of predetermined frequencies for the message identifier. The wireless receiver collects a first of a plurality of received sample sequences 602, one received sample sequence collected at each of the plurality of predetermined frequencies. The wireless receiver 300 collects each of the plurality of received sample sequences for one cycle of the message identifier, wherein the message identifier comprises a periodic signal that traverses an integer multiple of periods over a time period for collecting each of the plurality of received sample sequences.

At 604 a frequency offset is estimated and the received sample is adjusted according to the frequency offset. See description of FIG. 7 as well as the discussions above.

At 606, a correlation is performed between data corresponding to the message identifier and data corresponding to a first received sample sequence to provide a correlation result. The correlation result is compared to a threshold value to determine when or whether the message identifier has been detected. Preferably, the first received sample sequence is adjusted according to the frequency offset to create an adjusted received sample sequence and a circular time-domain correlation between the data corresponding to the message identifier and data corresponding to the adjusted received sample sequence is performed to give the correlation result. In the exemplary case, the peak magnitude squared of the circular time-domain correlation is compared to a threshold value to determine when the message identifier has been detected. In one embodiment, a wideband noise metric, as detailed above, is used when the message identifier is either a plurality of tones or a code set. In the case where the message identifier is a plurality of tones a narrowband noise metric is added to the wideband noise metric. See description of FIG. 8 and the discussions above.

When the message identified is not detected the No branch of decision point 608 is taken to 610. If the predetermined preamble sequence sampling plan has not been exhausted, e.g. three sets of samples at the three predetermined frequencies over three sampling periods, the No branch is taken to 612. At 612 counters for frequency and time slot are updated, if three samples have been taken a wait period of m seconds is invoked, in the exemplary case described above, m=80 milliseconds. The sampling process resumes at 602. When the scanning is performed at a number of wakeup times it may result in diversity gain when the plurality of predetermined frequencies are a selected and appropriate distance apart.

When the message identifier is detected, the Yes branch at 608 is followed to 614. The wireless receiver 300 is wakened for further processing from a reduced power consumption state. A signal source will be adjusted according to the frequency offset to compensate for a mismatch between the nominal frequency of the wireless receiver 300 and the frequency of the received sample sequence. When fully operational, that is, when the wireless receiver 300 is at full power, it will further refine the frequency offset estimates, make appropriate adjustments and proceed to sample the remaining slots in the frequency hopping sequence for the rest of the transmitted message.

After the message is received, the receiver is returned to the reduced power state and put in wait state 618, in the exemplary case, 80 milliseconds. Processing is then begun again at 600.

If at 610, the sampling plan has been exhausted, that is three samples taken at each of the three periods in the exemplary case, the Yes branch is taken, the receiver is returned to the reduced power state and put in wait state 618, in the exemplary case, 80 milliseconds. Processing is then begun again at 600.

Figure 7:
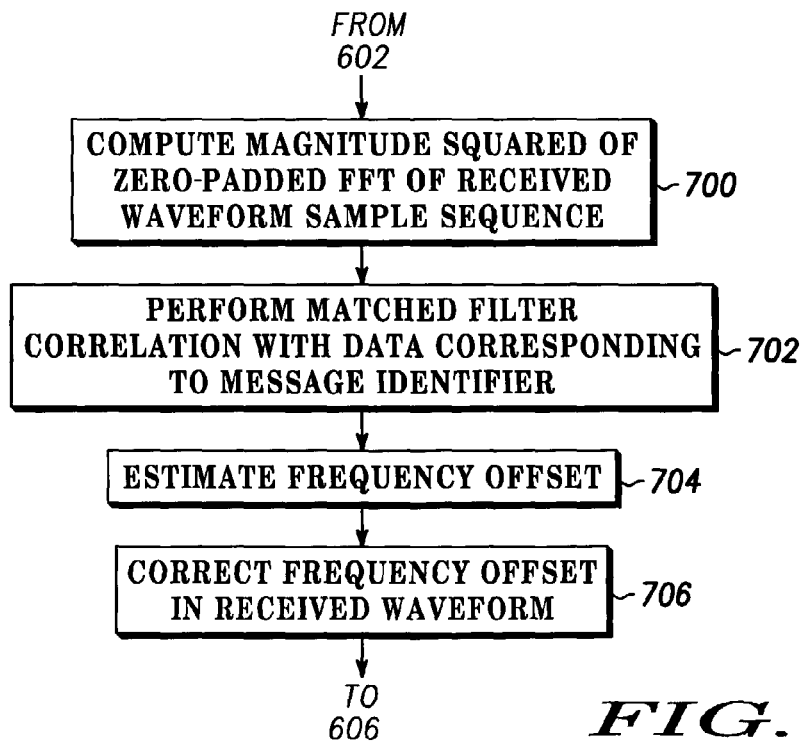
FIG. 7 depicts a flow chart showing a portion of the flow chart of FIG. 6 in more detail.

Referring to FIG. 7, a flow chart showing more detail for the flow chart of FIG. 6 is discussed and described. Following from 602, the frequency offset between a nominal frequency of the wireless receiver 300 and the frequency of the received sample sequence is estimated by finding a peak value in a frequency domain correlation of the data corresponding to the message identifier and the data corresponding to the received sample sequence. To obtain a better frequency offset estimate, a zero-padded Fast Fourier Transform of the received signal, in an exemplary case with twice the frequency resolution, is calculated 700 (Ref. Eq. 7). The expected waveform samples are similarly transformed by Fast Fourier Transform. A matched filter correlation in the frequency domain or frequency domain correlation is computed 702 (Ref. Eq. 9) and the frequency offset is then calculated 704 (Ref. Eq. 10). The calculated frequency offset is used to adjust the received waveform 706 (Ref. Eq. 12) and in later calculations to determine the time offset of the received signal following at 606.

Figure 8:
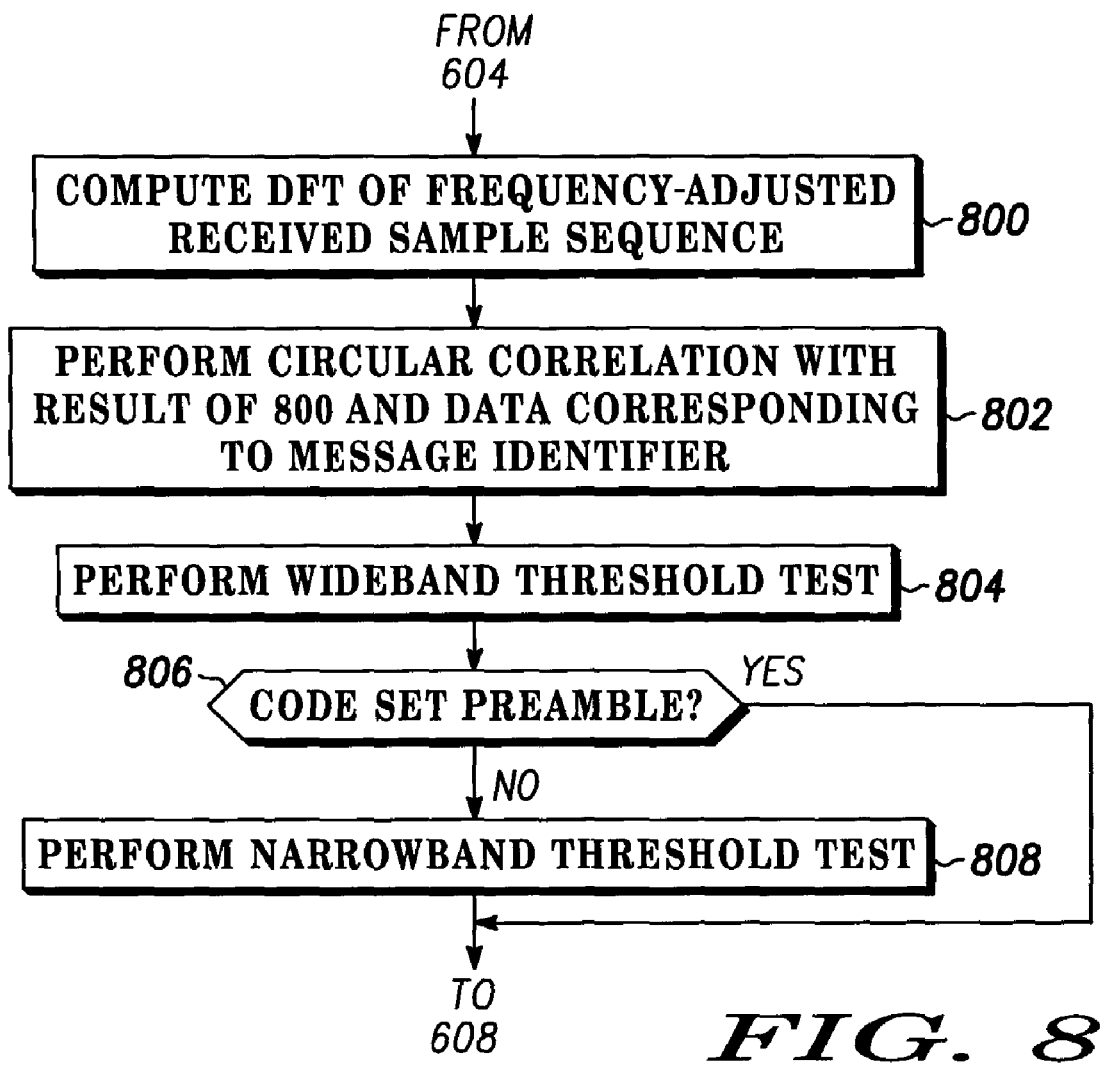
FIG. 8 depicts a further flow chart showing another portion of the flow chart of FIG. 6 in more detail.

Referring to FIG. 8, a flow chart showing more detail for the flow chart of FIG. 6 is discussed and described. Following from 604, the frequency-adjusted received waveform sample is operated on to determine a time offset of the received signal. The frequency-adjusted received sample sequence is transformed using a Discrete Fourier Transform to create a transformed sequence 800.

At 802 the transformed sequence is multiplied with the conjugate Discrete Fourier Transform of the data corresponding to the message identifier, creating a product sequence. An inverse Discrete Fourier Transform of the product sequence is computed, thereby creating a circular time-domain correlation of the adjusted received sample sequence with the message identifier (Ref. Eq.15). The Discrete Fourier Transform is computed using a Fast Fourier Transform and the inverse Discrete Fourier Transform is computed using an inverse Fast Fourier Transform.

Since the wideband threshold test applies to embodiments where the message identifier is either a plurality of tones or a BCH code set, the wideband test is applied 804. If the message identifier is a plurality of tones, a further narrowband test is performed 808 and processing continues at 608. If the message identifier is a BCH code set, the narrowband test may be avoided on the assumption that the distance between code sets will reduce false detections to an acceptable level. The Yes branch at 806 is taken and processing continues at 608.

The processes and apparatus discussed above, and the inventive principles thereof, are intended to and will overcome many of the difficult issues facing systems using frequency hopping CPFSK coding for asynchronous communication. Using the novel application of the algorithms and techniques for preamble signal design and detection the goals of faster valid preamble detection and reduced power consumption are achieved. Moreover, a number of adjustments made to the system ensure that the computationally intensive mathematics can be performed in the time allowed using the equipment at hand. Such adjustments and innovative combinations include but are not limited to: adjusting the preamble modulation to ensure periodicity over the proper time period and mod $2\pi$ radians in a phase shift system such that a circular time-domain correlation can be applied for a minimum length of time in the receiver using a minimal received sample, zero-padding to achieve better frequency offset calculations and limiting the number of non-zero elements of data corresponding to the expected preamble signal to reduce the number of calculations required for frequency offset calculation. In this last example, calculations are reduced by as much as a factor of 13 in some representative embodiments. The use of a predetermined, restricted number of hop frequencies for preamble signal transmission further reduces the burden on the receiver and if chosen according to the environment, increases the system diversity with respect to preamble detection.

This disclosure is intended to explain how to fashion and use various embodiments in accordance with the invention rather than to limit the true, intended, and fair scope and spirit thereof. The foregoing description is not intended to be exhaustive or to limit the invention to the precise form disclosed. Modifications or variations are possible in light of the above teachings. The embodiment(s) was chosen and described to provide the best illustration of the principles of the invention and its practical application, and to enable one of ordinary skill in the art to utilize the invention in various embodiments and with various modifications as are suited to the particular use contemplated. All such modifications and variations are within the scope of the invention as determined by the appended claims, as may be amended during the pendency of this application for patent, and all equivalents thereof, when interpreted in accordance with the breadth to which they are fairly, legally, and equitably entitled.

What is claimed is:

1. A method in a wireless receiver to detect a message identifier comprising:
    scanning, asynchronously and sequentially during a wakeup time and irrespective of signal strength, a plurality of predetermined frequencies for the message identifier;
    collecting a plurality of received sample sequences comprising in-phase and quadrature sequences of samples, one received sample sequence collected at each of the plurality of predetermined frequencies;
    performing a correlation between data corresponding to the message identifier and data corresponding to a first received sample sequence to provide a correlation result; and
    comparing the correlation result to a threshold value to determine when the message identifier has been detected.

2. The method of claim 1 wherein the scanning is performed at a number of wakeup times resulting in diversity gain when the plurality of predetermined frequencies are a selected distance apart.

3. The method of claim 1 further comprising:
waking the wireless receiver for further processing from a reduced power consumption state when the message identifier has been detected.

4. The method of claim 1 wherein the collecting further comprises:
collecting each of the plurality of received sample sequences for one cycle of the message identifier, wherein the message identifier comprises a periodic signal that traverses an integer multiple of periods over a time period for the collecting the each of the plurality of received sample sequences.

5. The method of claim 1 further comprising:
estimating a frequency offset between a nominal frequency of the wireless receiver and a frequency of the first received sample sequence by finding a peak value in a frequency domain correlation of the data corresponding to the message identifier and the data corresponding to the first received sample sequence.

6. The method of claim 5 further comprising:
adjusting a signal source according to the frequency offset to compensate for a mismatch between the nominal frequency of the wireless receiver and the frequency of the first received sample sequence.

7. The method of claim 5 wherein the performing a correlation further comprises:
adjusting the first received sample sequence according to the frequency offset to create an adjusted received sample sequence; and
performing a circular time-domain correlation between the data corresponding to the message identifier and data corresponding to the adjusted received sample sequence to give the correlation result.

8. The method of claim 7 wherein the performing a circular time-domain correlation further comprises:
transforming the adjusted received sample sequence using a Discrete Fourier Transform to create a transformed sequence; and
multiplying the transformed sequence with the conjugate Discrete Fourier Transform of the data corresponding to the message identifier to create a product sequence, and computing an inverse Discrete Fourier Transform of the product sequence, thereby creating a circular time-domain correlation of the adjusted received sample sequence with the message identifier.

9. The method of claim 1 wherein the comparing the correlation result further comprises comparing a peak magnitude squared of a circular time-domain correlation to the threshold value to said determine when the message identifier has been detected.

10. The method of claim 9 wherein the threshold value comprises:
a wideband noise metric, when the message identifier comprises one of a plurality of tones and a code set.

11. The method of claim 10 wherein the threshold value further comprises:
a narrowband noise metric, when the message identifier comprises a plurality of tones.

12. A wireless receiver arranged to detect a preamble signal to exit a standby low power mode, the wireless receiver comprising:
a receiver for scanning, asynchronously and sequentially during a wakeup time and irrespective of signal strength, a plurality of predetermined frequencies for the preamble signal;
a sampler, coupled to the receiver, for collecting a plurality of received sample sequences comprising in-phase and quadrature sequences of samples, one received sample sequence collected at each of the plurality of predetermined frequencies; and
a controller coupled to the receiver and sampler;
for performing a correlation between data corresponding to the preamble signal and data corresponding to a first received sample sequence to provide a correlation result; and
for comparing the correlation result to a threshold value to determine when the preamble signal has been detected.

13. The wireless receiver of claim 12 further comprising:
a power conservation circuit coupled to the controller operable to reduce the power consumption of the wireless receiver until notified by the controller that the preamble signal has been detected.

14. The wireless receiver of claim 12 wherein the sampler is operable to collect each of the plurality of received sample sequences for a predetermined time period, and wherein the preamble signal is periodic over an integer multiple of periods over the predetermined time period.

15. The wireless receiver of claim 12 wherein the controller is further operable to:
estimate a frequency offset between the first received sample sequence and a nominal frequency of the signal source as a peak of a correlation of a magnitude squared value of a Fast Fourier Transform of the first received sample sequence and a magnitude squared value of a Fast Fourier Transform of an expected preamble signal;
adjust the first received sample sequence according to the frequency offset to create an adjusted first received sample; and
perform a circular time-domain correlation between the data corresponding to the preamble signal and the adjusted received sample sequence to provide the correlation result.

16. The wireless receiver of claim 15 wherein the Fast Fourier Transform of the first received sample sequence is computed as a zero padded Fast Fourier Transform of the first received sample sequence resulting in a frequency resolution greater than a reciprocal of the time period for the collecting the first received sample sequence.

17. The wireless receiver of claim 15 wherein the circular time-domain correlation further comprises:
computing an inverse Discrete Fourier Transform of the product of a Discrete Fourier Transform of the adjusted first received sample and a conjugate Discrete Fourier Transform of the data corresponding to the preamble signal.

18. The wireless receiver of claim 15 wherein the data corresponding to the preamble signal are clipped to limit the number of non-zero elements thereby reducing the number of computations to estimate the frequency offset.

19. The wireless receiver of claim 15 wherein the controller is further operable to compare the correlation result to a first threshold value corresponding to a wide-band noise metric.

20. The wireless receiver of claim 19 wherein the controller is further operable to compare the correlation result to a second threshold value corresponding to a narrowband noise metric when the preamble signal comprises a plurality of tones.

* * * * *